US008737308B2

(12) United States Patent
Gaal et al.

(10) Patent No.: US 8,737,308 B2
(45) Date of Patent: May 27, 2014

(54) SYNCHRONIZED UPLINK-DOWNLINK HOP FOR MEASUREMENTS

(75) Inventors: Peter Gaal, San Diego, CA (US); Alan Barbieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/534,962

(22) Filed: Jun. 27, 2012

(65) Prior Publication Data

US 2013/0010687 A1   Jan. 10, 2013

Related U.S. Application Data

(60) Provisional application No. 61/504,083, filed on Jul. 1, 2011.

(51) Int. Cl.
*H04W 24/00* (2009.01)

(52) U.S. Cl.
USPC .......................................... 370/328; 370/252

(58) Field of Classification Search
USPC .................. 370/328, 329, 252, 350
See application file for complete search history.

(56) References Cited

U.S. PATENT DOCUMENTS

| 5,884,145 | A | 3/1999 | Haartsen | |
|---|---|---|---|---|
| 6,970,708 | B1 * | 11/2005 | Raith | 455/440 |
| 6,985,465 | B2 | 1/2006 | Cervello et al. | |
| 7,133,680 | B2 * | 11/2006 | Crisan | 455/450 |
| 7,164,916 | B1 * | 1/2007 | Ahnlund et al. | 455/437 |
| 7,983,298 | B2 | 7/2011 | Nanda et al. | |
| 8,290,503 | B2 | 10/2012 | Sadek et al. | |
| 2008/0064400 | A1 * | 3/2008 | Benco et al. | 455/436 |
| 2010/0246506 | A1 | 9/2010 | Krishnaswamy | |
| 2010/0254281 | A1 | 10/2010 | Kim et al. | |
| 2010/0322185 | A1 | 12/2010 | Park et al. | |
| 2011/0105122 | A1 | 5/2011 | Wu | |
| 2011/0110255 | A1 | 5/2011 | Park et al. | |
| 2011/0250858 | A1 | 10/2011 | Jain et al. | |
| 2012/0249366 | A1 * | 10/2012 | Pozgay et al. | 342/354 |

FOREIGN PATENT DOCUMENTS

| WO | 3094395 | 11/2003 |
|---|---|---|
| WO | WO2011056316 A1 | 5/2011 |

OTHER PUBLICATIONS

International Search Report and Written Opinion—PCT/US2012/044666—ISA/EPO—Oct. 9, 2012.

* cited by examiner

*Primary Examiner* — Brian D Nguyen
(74) *Attorney, Agent, or Firm* — Seyfarth Shaw LLP

(57) ABSTRACT

A method of wireless communication is provided which includes communicating with a base station on a first channel and tuning to a second channel concurrently with the base station tuning to a second or third channel. The method also includes measuring interference on the second channel and re-tuning to the first channel concurrently with the base station re-tuning to the first channel. The method further includes reporting channel quality, based on the interference, to the base station to enable channel selection.

32 Claims, 11 Drawing Sheets

SYNCHRONIZED UPLINK-DOWNLINK HOP FOR MEASUREMENTS

CROSS-REFERENCE TO RELATED APPLICATION

This application claims the benefit under 35 U.S.C. §119(e) to U.S. Provisional Patent Application No. 61/504,083 entitled "SYNCHRONIZED UPLINK-DOWNLINK HOP FOR MEASUREMENTS," filed on Jul. 1, 2011, the disclosure of which is expressly incorporated by reference herein in its entirety.

BACKGROUND

1. Field

Aspects of the present disclosure relate generally to wireless communication systems, and more particularly to synchronized uplink-downlink hop measurements.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes communicating on a first channel with a base station and tuning to a second channel concurrently with the base station tuning to a second or third channel. The method also includes measuring interference on the second channel. The method further includes re-tuning to the first channel concurrently with the base station re-tuning to the first channel. Additionally, the method includes reporting channel quality, based on the interference, to the base station to enable channel selection.

Another aspect of a method of wireless communication is disclosed which includes communicating on a first channel with a base station. The method also includes tuning to a second channel and measuring interference on the second channel. The method further includes re-tuning to the first channel and determining a channel quality based on the interference. Additionally, the method includes reporting the channel quality to the base station to enable channel selection.

Yet another aspect of a method of wireless communication is disclosed which includes communicating on a first channel with a user equipment (UE). The method includes tuning to a second channel concurrently with the UE tuning to the second channel. The method also includes measuring a signal strength of the second channel. The method further includes re-tuning to the first channel concurrently with the UE re-tuning to the first channel. Additionally, the method includes enabling channel selection based on the signal strength of the second channel.

In another aspect, a wireless communication having a memory and at least one processor coupled to the memory is disclosed. The processor(s) is configured to communicate on a first channel with a base station and tune to a second channel concurrently with the base station tuning to a second or third channel. The processor(s) is also configured to measure interference on the second channel. The processor(s) is configured to re-tune to the first channel concurrently with the base station re-tuning to the first channel. Further, the processor(s) is configured to report channel quality, based on the interference, to the base station to enable channel selection.

Another aspect discloses a processor(s) configured to communicate on a first channel with a base station. The processor(s) is configured to tune to a second channel and to measure interference on the second channel. The processor(s) is also configured to re-tune to the first channel and to determine a channel quality based on the interference. The processor(s) is further configured to report the channel quality to the base station to enable channel selection.

Another aspect discloses a processor(s) configured to communicate on a first channel with a user equipment (UE). The processor(s) is configured to tune to a second channel concurrently with the UE tuning to the second channel. The processor(s) is also configured to measure a signal strength of the second channel. The processor(s) is further configured to re-tune to the first channel concurrently with the UE re-tuning to the first channel. Additionally, the processor(s) is configured to enable channel selection based on the signal strength of the second channel.

In another aspect, a computer program product for wireless communications in a wireless network having a non-transitory computer-readable medium is disclosed. The computer readable medium has program code recorded thereon which, when executed by the processor(s), causes the processor(s) to perform operations. The program code includes program code for communicating on a first channel with a base station. The program code also includes program code to tune to a second channel concurrently with the base station tuning to a second or third channel. The program code further include program code to measure interference on the second channel. The program code further includes program code to re-tune to the first channel concurrently with the base station re-tuning to the first channel. Additionally, the program code includes program code to report the channel quality, based on the interference, to the base station to enable channel selection.

Another aspect discloses a computer program product for wireless communications in a wireless network having a non-transitory computer-readable medium. The computer readable medium has program code recorded thereon which, when executed by the processor(s), causes the processor(s) to perform operations. The program code includes program code for communicating on a first channel with a base station. The program code also includes program code to tune to a second channel and measure interference on the second channel. The program code further includes program code to re-tune to the first channel and determine a channel quality based on the interference. Additionally, the program code includes program code to report the channel quality to the base station to enable channel selection.

Yet another aspect discloses a computer program product for wireless communications in a wireless network having a non-transitory computer-readable medium is disclosed. The computer readable medium has program code recorded thereon which, when executed by the processor(s), causes the processor(s) to perform operations. The program code includes program code for communicating on a first channel with a user equipment (UE). The program code also includes program code to tune to a second channel concurrently with the UE tuning to the second channel. The program code includes program code to measure signal strength of the second channel. The program code further includes program code to re-tune to the first channel concurrently with the UE re-tuning to the first channel. Additionally, the program code includes program code to enable channel selection based on the signal strength of the second channel.

In another aspect, an apparatus for wireless communication is disclosed and includes means for communicating on a first channel with a base station. The apparatus also includes means for tuning to a second channel concurrently with the base station tuning to a second or third channel. The apparatus includes means for measuring interference on the second channel. The apparatus further includes means for re-retuning to the first channel concurrently with the base station re-tuning to the first channel. Additionally, the apparatus includes means for reporting the channel quality based on the interference, to the base station to enable channel selection.

Another aspect discloses an apparatus including means for communicating on a first channel with a base station and a means for tuning to a second channel. The apparatus also includes means for measuring interference on the second channel. The apparatus further includes means for re-tuning to the first channel and means for determining a channel quality based on the interference. Additionally, the apparatus includes means for reporting the channel quality to the base station to enable channel selection.

Still another aspect discloses an apparatus including means for means for communicating on a first channel with a user equipment (UE). The apparatus includes means for tuning to a second channel concurrently with the UE tuning to the second channel. The apparatus also includes means for measuring a signal strength of the second channel. The apparatus further includes means for re-tuning to the first channel concurrently with the UE re-tuning to the first channel. Additionally, the apparatus includes means for enabling channel selection based on the signal strength of the second channel.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
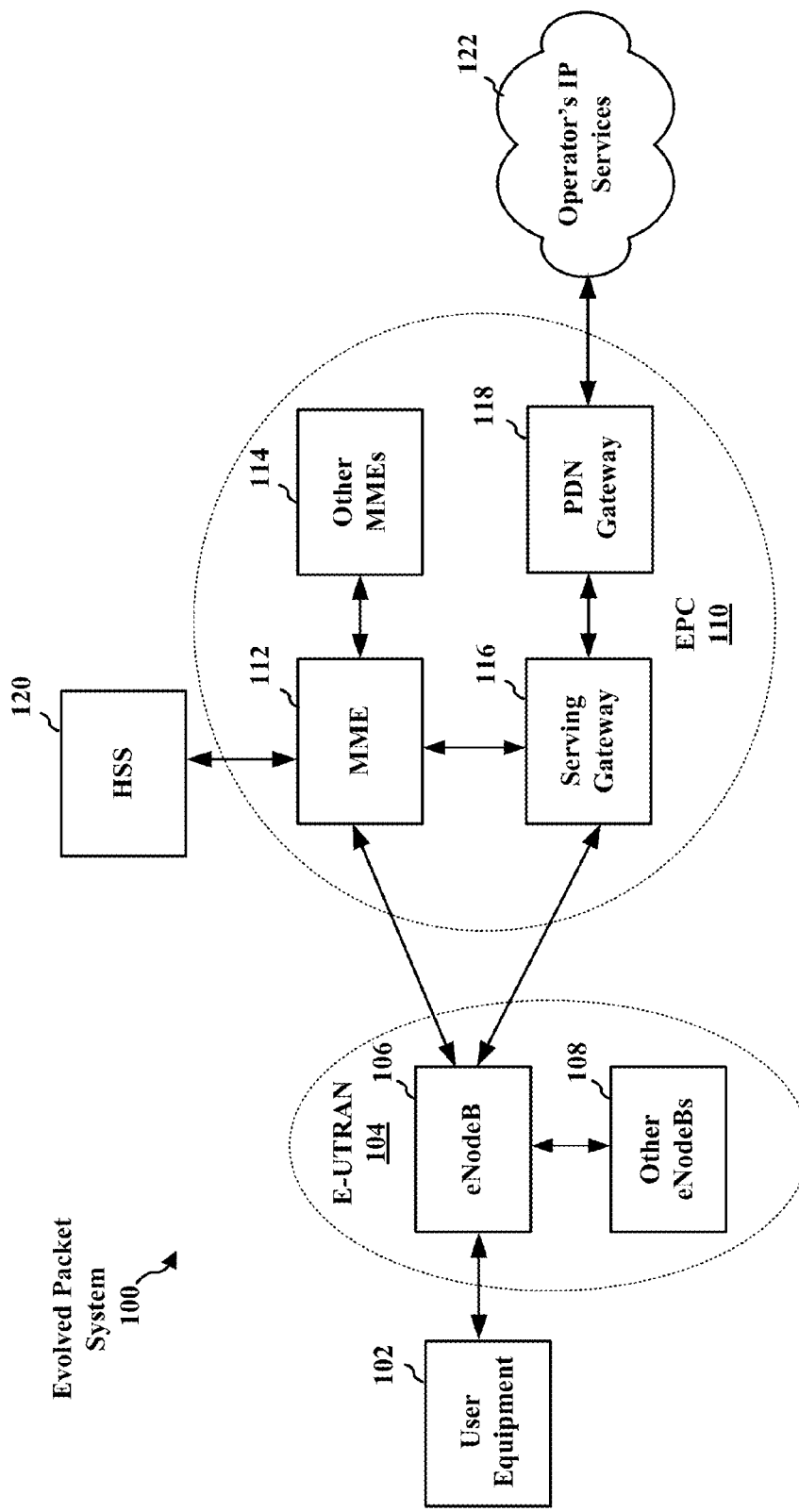
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
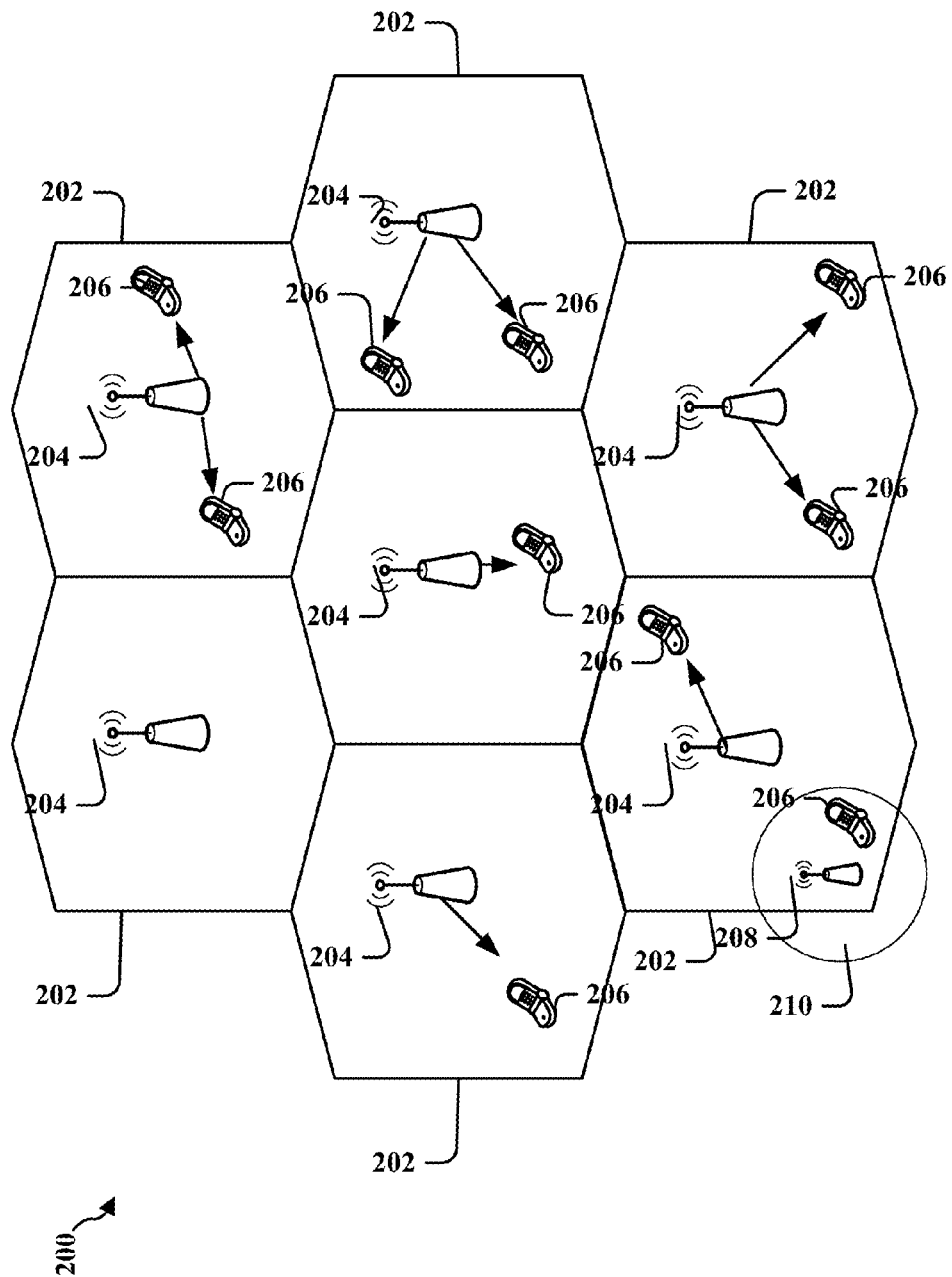
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
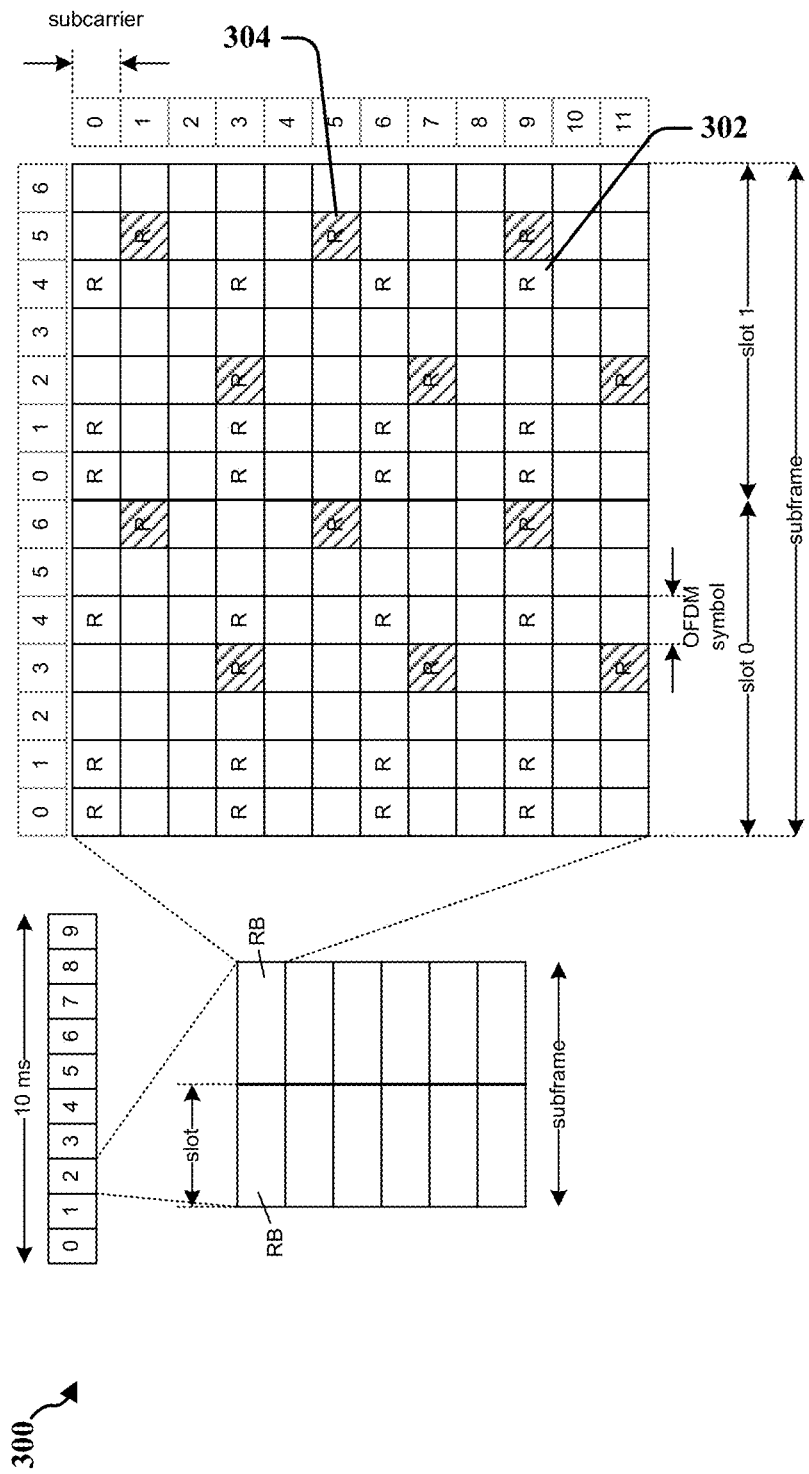
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
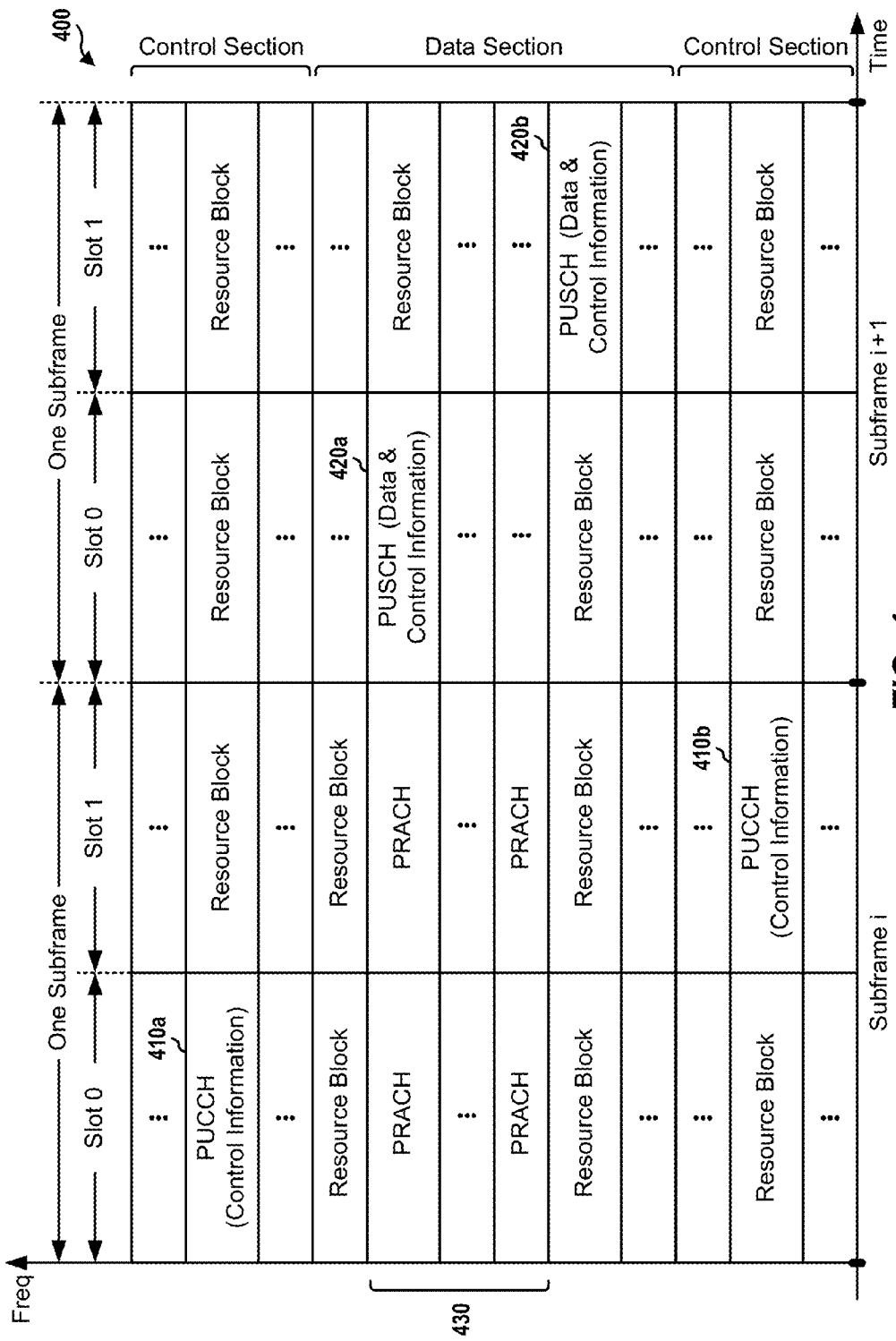
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
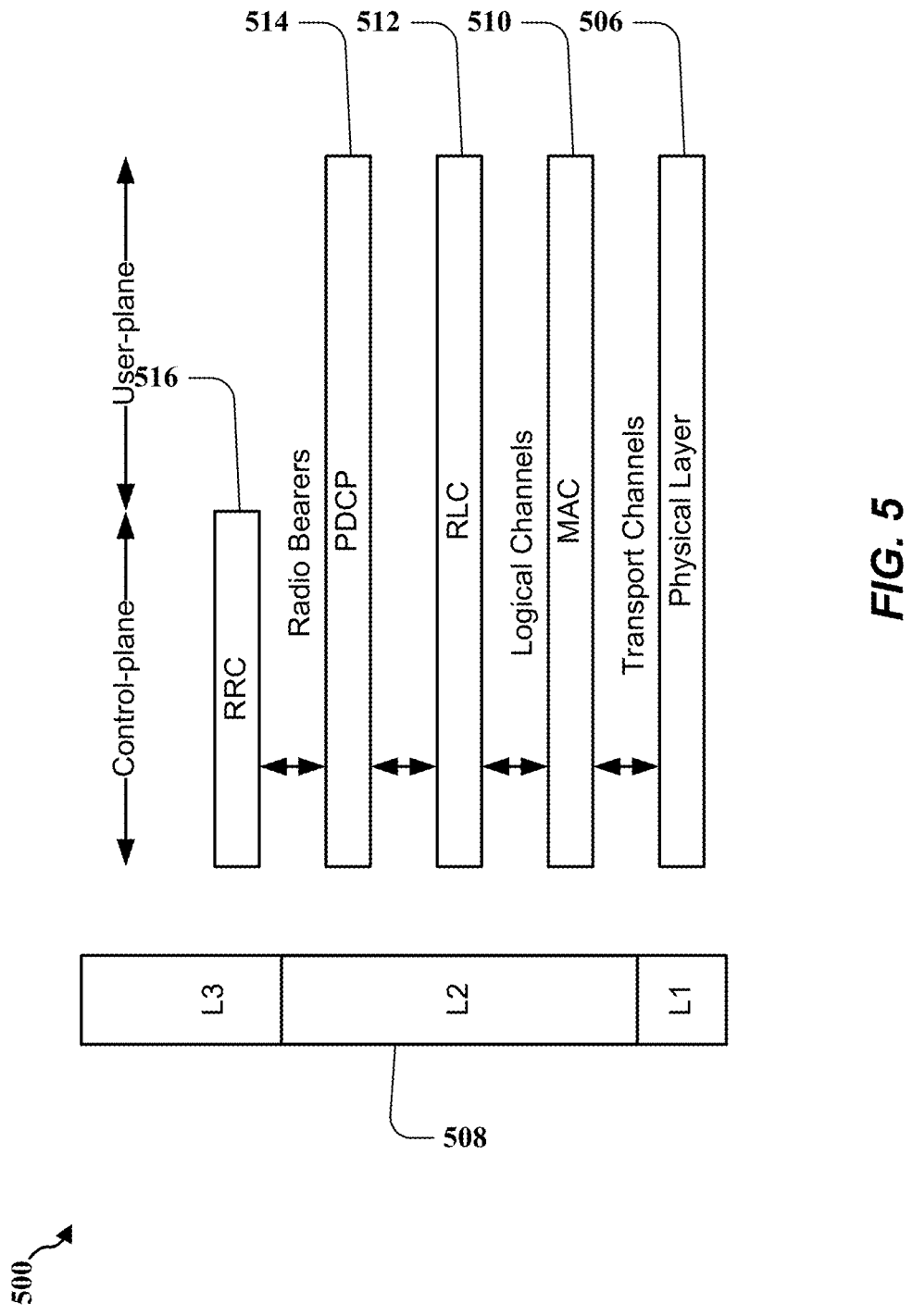
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers)

and for configuring the lower layers using RRC signaling between the eNodeB and the UE.

Figure 6:
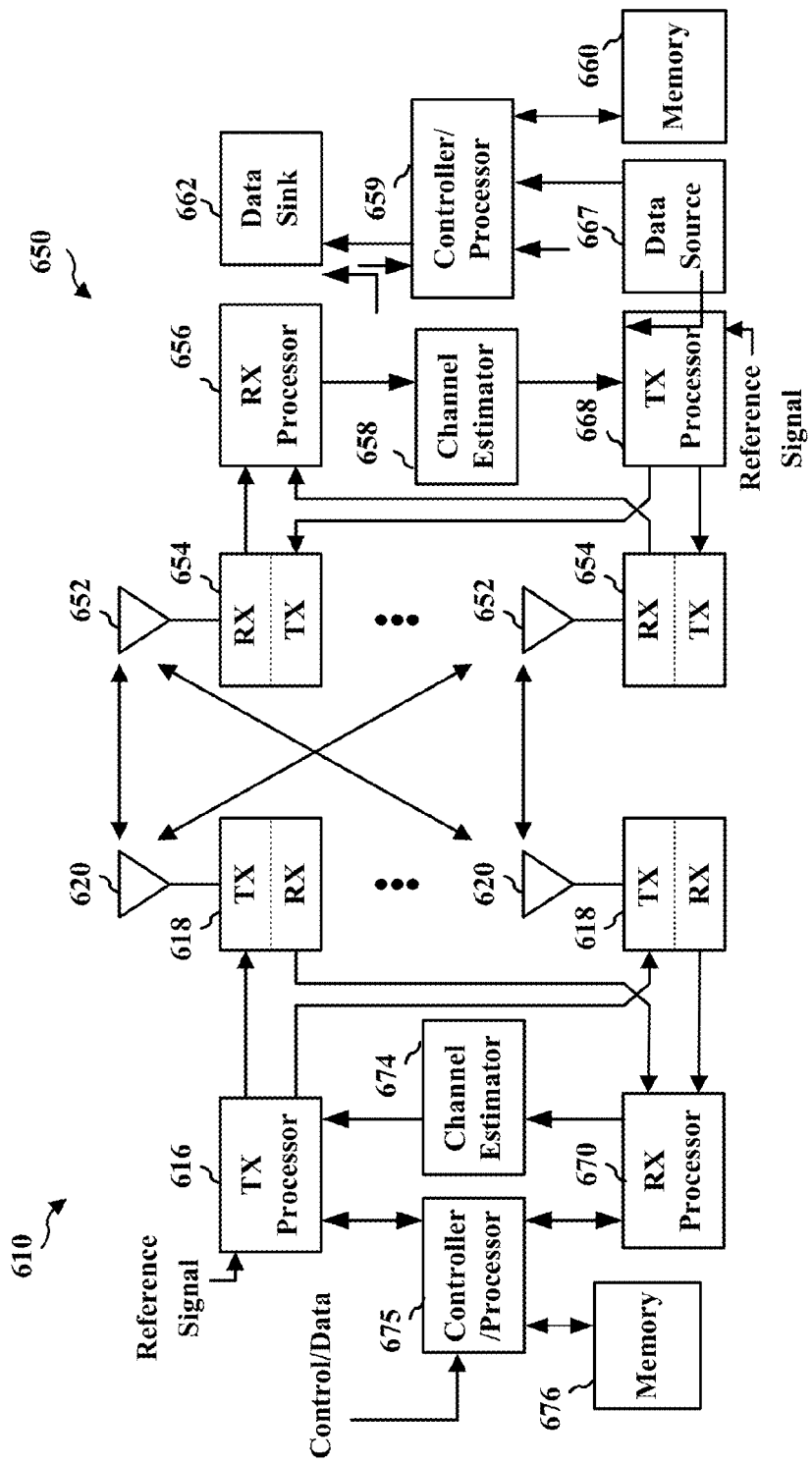
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an radio frequency carrier with a respective spatial stream for transmission.

At the UE 650, each receiver 654RX receives a signal through its respective antenna 652. Each receiver 654RX recovers information modulated onto a radio frequency carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates a radio frequency carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto a radio frequency carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to In a communications system or network where multiple downlink channels are available, the number of radio frequency transceivers for an eNodeB 610 may be less than the number of available channels. For example, the wireless communication network 100 may include a wide spectrum of white space frequencies having many narrow channels, in addition to the licensed spectrum. The white space network or cognitive radio network may include television white space (TVWS) channels or may apply to authorized shared access (ASA) networks. Therefore, as a result of the limited number of transceivers, an eNodeB 610 may include a frequency selection module.

In general, it is assumed the UE 650 has a single receiver. It can also be assumed that channel selection is based on UE-reported measurements.

In a wireless communications network, a certain set of frequencies are licensed for communication between a UE 650 and an eNodeB 610. These frequencies may include white space frequencies or ASA frequencies. Accordingly, the UE 650 may be able to transfer from one frequency to another, take measurements on the frequency, and select a frequency to operate on based on the existing signal. For example, the UE 650 may decide to operate on the frequency with the greatest channel quality. That is, the UE 650 may move from one frequency to another because of interference on the current frequency. It should be noted that the term frequency may be referred to as a channel.

In some aspects, it may be desirable to measure channels, which are available but are not currently used by the eNodeB 610. For example, while the eNodeB 610 can switch downlink frequencies, the eNodeB 610 may be unavailable on a new channel because the eNodeB 610 does not simultaneously transmit on multiple (or enough) downlink frequencies or channels. In this aspect, the UE 650 may not find broadcast signals, (e.g., an LTE primary synchronization signal (PSS)/secondary synchronization signal (SSS), common reference signal (CRS), etc.) for inter-frequency measurement of the currently unused channels. Thus, the cell may not be detected and the reference signal received power (RSRP) may not be measured if the eNodeB 610 is not broadcasting a signal.

In some aspects of the present disclosure, methods for performing inter-frequency measurements and using the inter-frequency measurements at the eNodeB 610 are disclosed. The proposed methods may be desirable for detecting interference conditions and comparing different channels.

In some aspects, the UE 650 may be configured to measure the interference on channels on which an eNodeB 610 does not operate. In this aspect, a signal from the eNodeB 610 is not measured. Furthermore, according to the present aspect, only the receiver (UE 650) may tune to a new channel to measure interference. The transmitter (eNodeB 610) does not tune to the new channel.

Such inter-frequency measurement may be beneficial, for example, when the eNodeB 610 is transmitting on a current channel and a new channel has a similar frequency as the current channel. As a result, the signal strength on the current channel and the signal strength on the new channel may potentially be similar. In this aspect, it may not be beneficial to measure the signal strength of the new channel, still, it would be desirable to measure the interference on the new channel. That is, the interference on the current channel could be different in comparison to the interference of the new channel even though the signal strengths of the new channel and the current channel may be similar. For example, a WLAN access point may be operating on the current channel, and a WLAN access point may not be operating on the new channel.

The proposed method of detecting the interference and not measuring signal strength may be useful for detecting interference conditions when the path loss, antenna gain, and/or effective transmit power are comparable on different channels. The proposed method may also be beneficial because scheduled or autonomous gaps may be used in the receiver, and therefore, these scheduled or autonomous gaps have no impact on the transmitter. Furthermore, because there is no channel estimation in this proposed method, some delays may occur after frequency change for the purpose of channel acquisition (e.g., stabilizing automatic gain control (AGC), frequency tracking, etc). Thus, the aforementioned delay should be accounted for when scheduling the measurement on the new channel.

In some aspects, it may be desirable to measure both interference and signal strength on a new channel. For example, the interference and signal strength may be measured on the new channel when the frequency of the current and new channel are far apart or when the eNodeB 610 uses different hardware and potentially different transmit powers on the current and new channels. When the eNodeB 610 cannot correct for these differences, actual measurements of signal strengths and interference may be desirable.

Measuring both signal strength and interference may allow for a substantially instantaneous switch with concurrent channel estimation available on multiple frequencies. In some aspects, the signal strength and the interference may be measured for both the downlink and uplink channels.

Signals can be measured based on the reference signal received power (RSRP) and the reference signal received quality (RSRQ). The RSRP may be the detected eNodeB signal power for a single eNodeB 610 and the RSRQ may be the detected signal power for the single eNodeB 610 divided by a total received power. The reference signal may be an uplink sounding reference signal (UL-SRS) or a downlink common reference signal (DL-CRS).

In order to measure multiple channels, the eNodeB 610 and the UE 650 may coordinate the channels to which they each will tune. For example, a pre-agreed hop pattern can indicate channels and a time to tune to each channel. Thus, when the UE 650 and the eNodeB 610 both tune to a new channel, a measurement can occur for both the signal strength and the interference of the new channel. This process may be repeated for multiple channels.

In some aspects, the hop pattern from a current channel to a new channel may be a statically configured hop pattern so that the eNodeB 610 and the UE 650 can synchronize a hop to the new channel. That is, the eNodeB 610 and the UE 650 may concurrently tune to the new channel based on the pre-agreed channel and may concurrently re-tune to the current channel. Accordingly, due to the synchronization or pre-agreement, the UE 650 may spend minimal or no time for acquiring the new channel before transmission. That is because the signal timing and frequency on the new channel can be well estimated by the mobile station based on the signal received on the current channel.

In one configuration, the same hop pattern is applied to all UEs irrespective of their current serving channel. In some aspects, both the UE 650 and the eNodeB 610 may follow the same hop pattern to retune both their receivers and transmitters using different subframes in an uplink/downlink configuration, such as a TDD configuration.

The UE 650 and the eNodeB 610 may transmit a short reference signal to enable estimating the quality of the new channel. The short reference signal may be similar to a sounding reference signal (SRS), as opposed to, for example, a regular acquisition signal sent once every 5 ms. The signal strength measurement and the interference measurement of the new channel may occur simultaneously. According to the current aspect, the eNodeB 610 does not have to transmit synchronization signals because the UE 650 assumes good frequency and time synchronization and only looks for the signal of the current serving cell.

Each hop may have an overhead of 1 millisecond including a 300 microsecond tune-away, a 400 microsecond measurement, and a 300 microsecond tune back. In some aspects, the hop time may be less. For example, the hop time may be less than 1 millisecond when a multimedia broadcast over single frequency network (MBSFN) subframe is used.

Figure 7A:
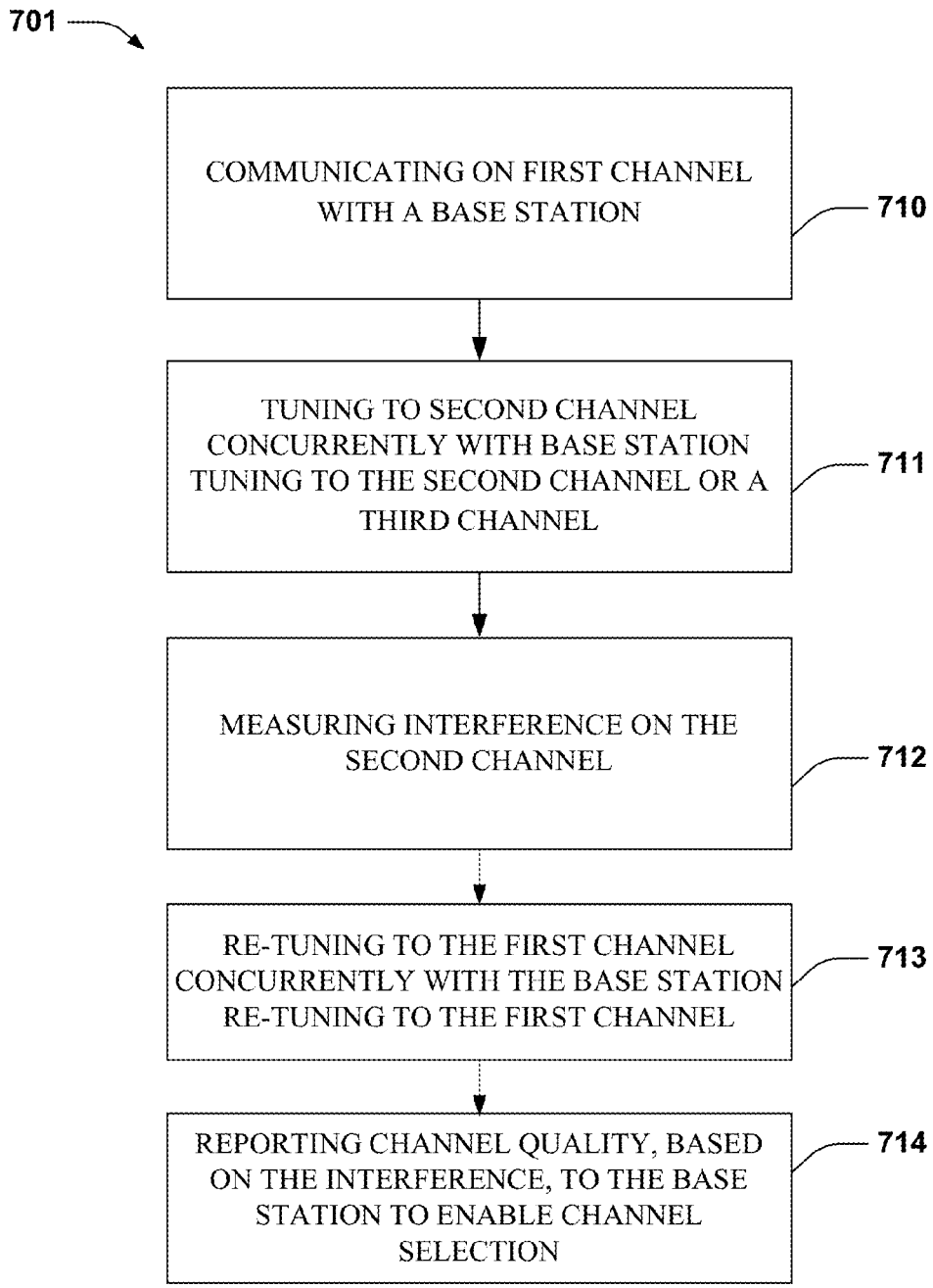
FIGS. 7A-7C are block diagrams illustrating a method for synchronized uplink-downlink hop measurements.
Figure 7B:
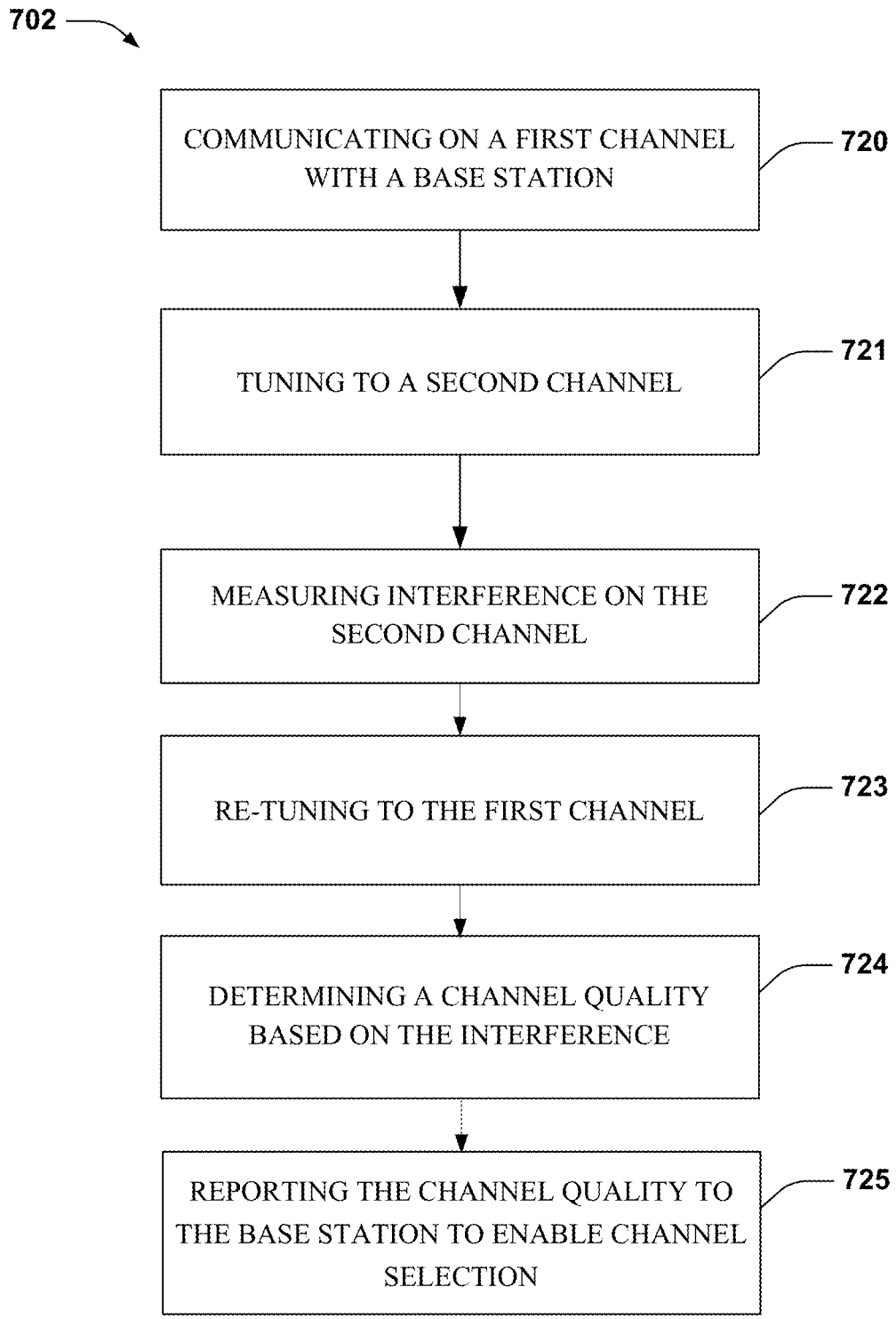
Figure 7C:
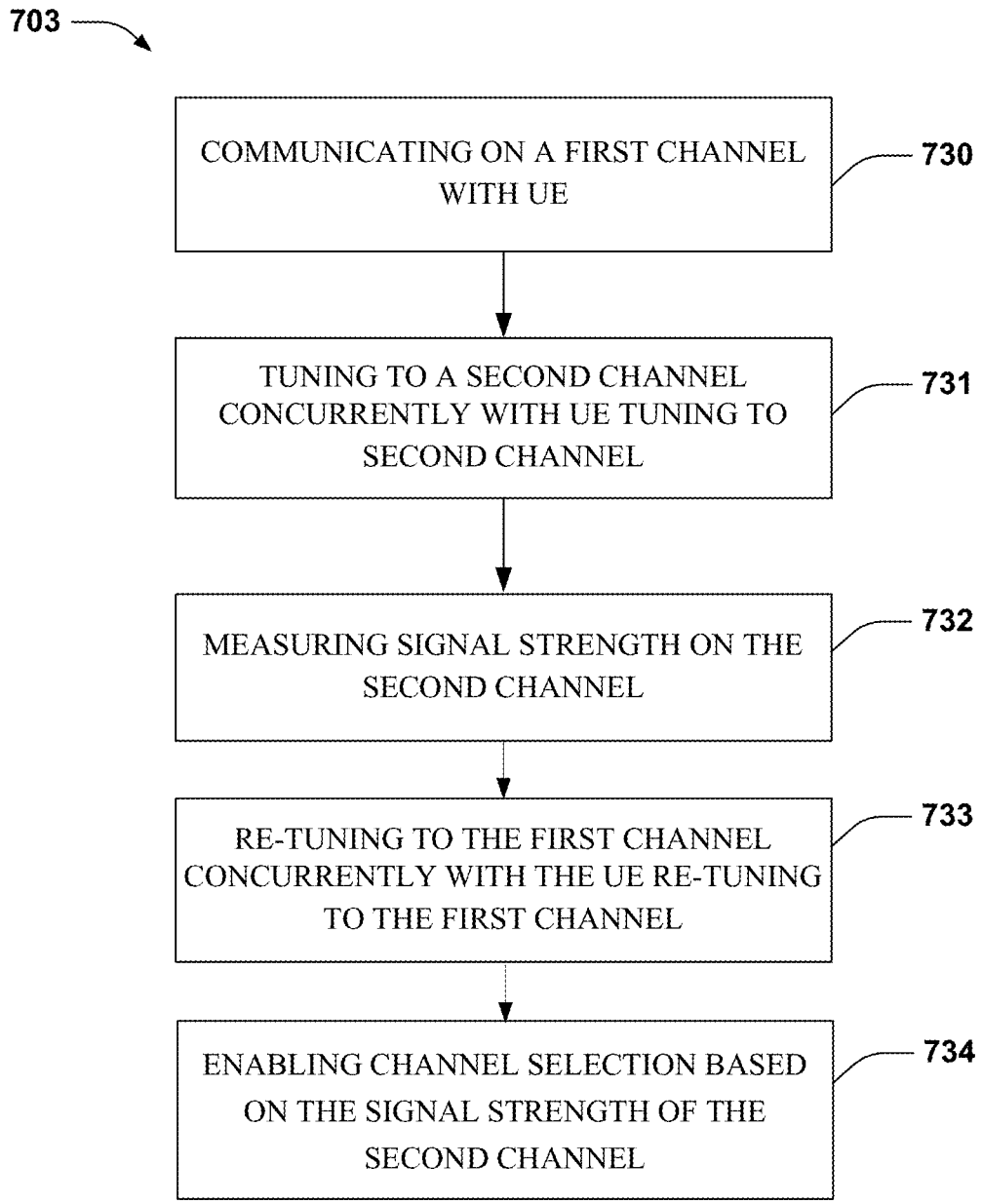

FIGS. 7A-7C are block diagrams illustrating methods for wireless communication. The processes 701 and 702 can be implemented in the UE 650 of FIG. 6. The process 701, illustrated in FIG. 7A, starts at block 710 by a UE communicating on a first current channel with a base station. At block 711, the UE tunes to a second channel concurrently with a base station tuning to the second channel or a third channel. At block 712, the UE measures interference on the second channel. Next, at block 713, the UE re-tunes to the first channel concurrently with the base station re-tuning to the first channel. At block 714, the UE reports the channel quality, based on the interference, to the base station to enable channel selection.

FIG. 7B illustrates a process 702 where a UE communicates with a base station on a first channel, at block 720. At block 721, the UE tunes to a second channel. The UE measures interference on the second channel at block 722. At block 723, the UE re-tunes to the first channel. The UE, at block 724, determines a channel quality based on the interference. At block 725, the UE reports the channel quality to the base station to enable channel selection.

The process 703 illustrated in FIG. 7C may be implemented in the base station 610 of FIG. 6. At block 730, a base station communicates on a first channel with a UE. The base station tunes to a second channel concurrently with a tuning to a second channel at block 731. At block 732, the base station measures the signal strength on the second channel. At block 733, the base station re-tunes to the first channel, concurrently with the UE re-tuning to the first channel. The base station enable channel selection based on the signal strength of the second channel at block 734.

In one configuration, the UE 650 is configured for wireless communication including means for communicating on a first channel with the base station. In one aspect, the communicating means may be the receive processor 656, transmit processor 668, receivers/transmitters 454, controller/processor 659, memory 660, and/or antenna 652 configured to perform the functions recited by the communicating means. The UE 650 is also configured to include a means for tuning In one aspect, the tuning means may be the antenna 652, controller/processor 659 and/or the memory 660 configured to perform the functions recited by the tuning means. The UE 650 is also configured to include a means for measuring. In one aspect, the measuring means may be the receive processor 656, antenna 652, controller/processor 659 and/or the memory 660 configured to perform the functions recited by the measuring means. The UE 650 is also configured to include a means for re-tuning In one aspect, the re-tuning means may be the controller/processor 659, antenna 652 and/or the memory 660 configured to perform the functions recited by the re-tuning means. The UE 650 is also configured to include a means for reporting. In one aspect, the reporting means may be the transmit processor 668, transmitters 654, controller/processor 659, memory 660, and/or antenna 652 configured to perform the functions recited by the reporting means. Optionally, the UE 650 may also be configured to include a means for determining a channel quality. In one aspect, the determining means may be the controller/processor 659 and/or the memory 660 configured to perform the functions recited by the measuring means. In another aspect, the aforementioned means may be a module or any apparatus configured to perform the functions recited by the aforementioned means.

In one configuration, the eNodeB 610 is configured for wireless communication including means for communicating on a first channel with a UE. In one aspect, the communicating means may be the receive processor 670, transmit processor 616, receivers/transmitters 618, controller processor 675 and memory 646 configured to perform the functions recited by the communicating means. The eNodeB 610 is also configured to include a means for tuning In one aspect, the tuning means may be the antenna 620, controller/processor 675 and/or the memory 676 configured to perform the functions recited by the tuning means. The eNodeB 610 is also configured to include a means for measuring interference. In one aspect, the measuring means may be the receive processor 670, antenna 620, controller/processor 675 and/or the memory 676 configured to perform the functions recited by the measuring means configured to perform the functions recited by the measuring means. The eNodeB 610 is also configured to include a means for re-tuning In one aspect, the re-tuning means may be the antenna 620, controller/processor 675 and/or the memory 676 configured to perform the functions recited by the re-tuning means. The eNodeB 610 is also configured to include a means for determining. In one aspect, the determining means may be the controller/processor 675 and/or the memory 676 configured to perform the functions recited by the determining means. The eNodeB 610 is also configured to include a means for reporting. In one aspect, the reporting means may be the transmit processor 616, transmitters 618, controller/processor 675, memory 676 and/or antenna 620 configured to perform the functions recited by the reporting means. In another aspect, the aforementioned means may be any module or any apparatus configured to perform the functions recited by the aforementioned means.

Figure 8:
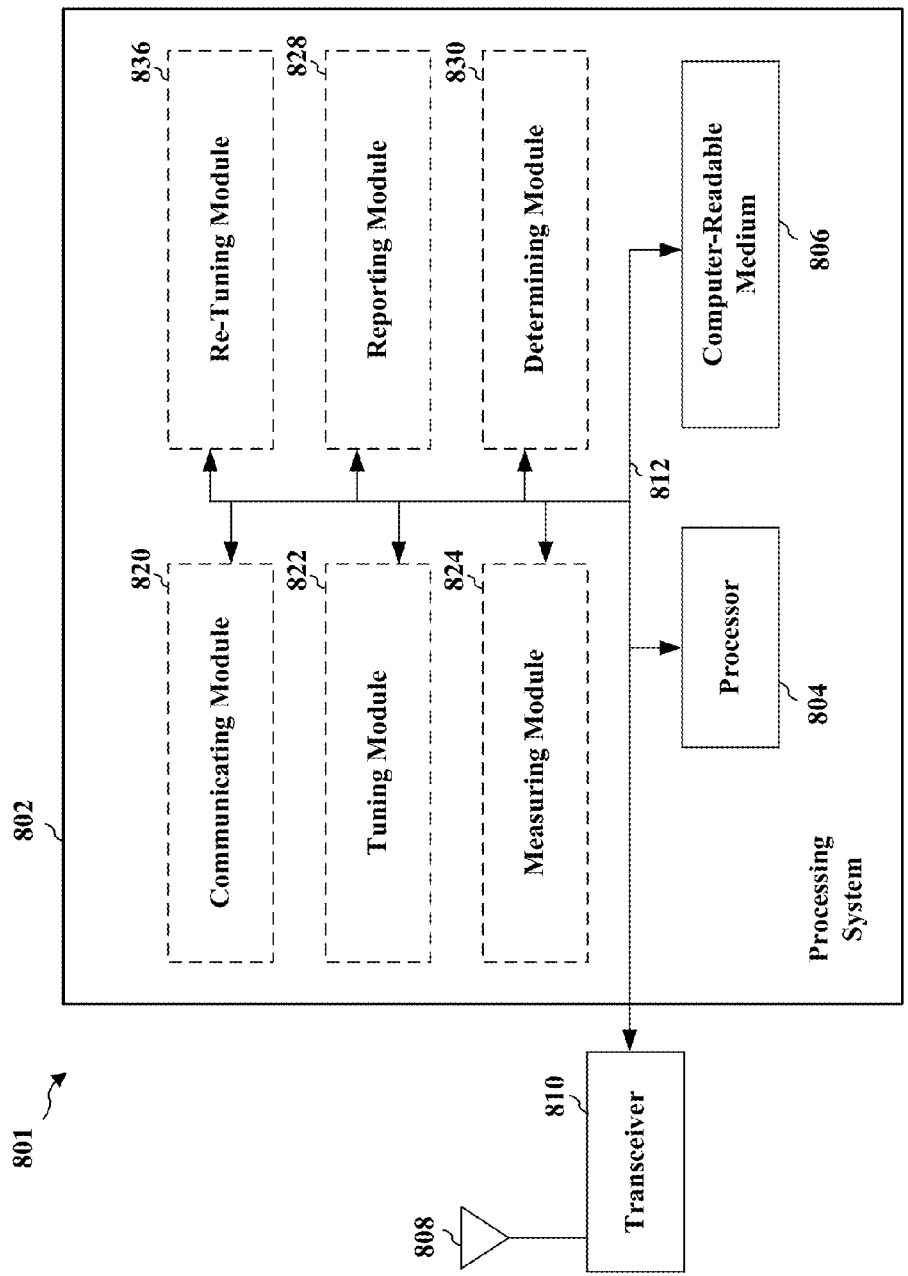
FIG. 8 is a block diagram illustrating different modules/means/components in an exemplary UE apparatus.

FIG. 8 is a diagram illustrating an example of a hardware implementation for an apparatus 801 employing a processing system 802. The processing system 802 may be implemented with a bus architecture, represented generally by the bus 812. The bus 812 may include any number of interconnecting buses and bridges depending on the specific application of the processing system 802 and the overall design constraints. The bus 812 links together various circuits including one or more processors and/or hardware modules, represented by the processor 804 the modules 820, 822, 824, 826, 828. 830, and the computer-readable medium 806. The bus 812 may also link various other circuits such as timing sources, peripherals, voltage regulators, and power management circuits, which are well known in the art, and therefore, will not be described any further.

The apparatus includes a processing system 802 coupled to a transceiver 810. The transceiver 810 is coupled to one or more antennas 808. The transceiver 810 enables communicating with various other apparatus over a transmission medium. The processing system 802 includes a processor 804 coupled to a computer-readable medium 806. The processor 804 is responsible for general processing, including the execution of software stored on the computer-readable medium 806. The software, when executed by the processor 804, causes the processing system 802 to perform the various functions described for any particular apparatus. The computer-readable medium 806 may also be used for storing data that is manipulated by the processor 804 when executing software.

The processing system 802 includes a communicating module 820, tuning module 822, measuring module 824, re-tuning module 826, and a reporting module 828. The communicating module 820 can communicate with a base station on a first channel. The tuning module 822 can tune to a second channel concurrently with a base station tuning to the second or a third channel. The measuring module 824 can measure interference on the second channel. The re-tuning module 826 can retune to the first channel concurrently with the base station re-tuning to the first channel. The reporting module 828 can report channel quality to the base station. Further, in an optional aspect, the processing system 802 includes a determining module 830 that determines a channel quality based on the interference level. The modules may be software modules running in the processor 804, resident/stored in the computer readable medium 806, one or more hardware modules coupled to the processor 804, or some combination thereof. The processing system 802 may be a component of the UE 650 and may include the memory 660, the transmit processor 668, the receive processor 656, the modulators/demodulators 654a-r, the antenna 652, and/or the controller/processor 659.

Figure 9:
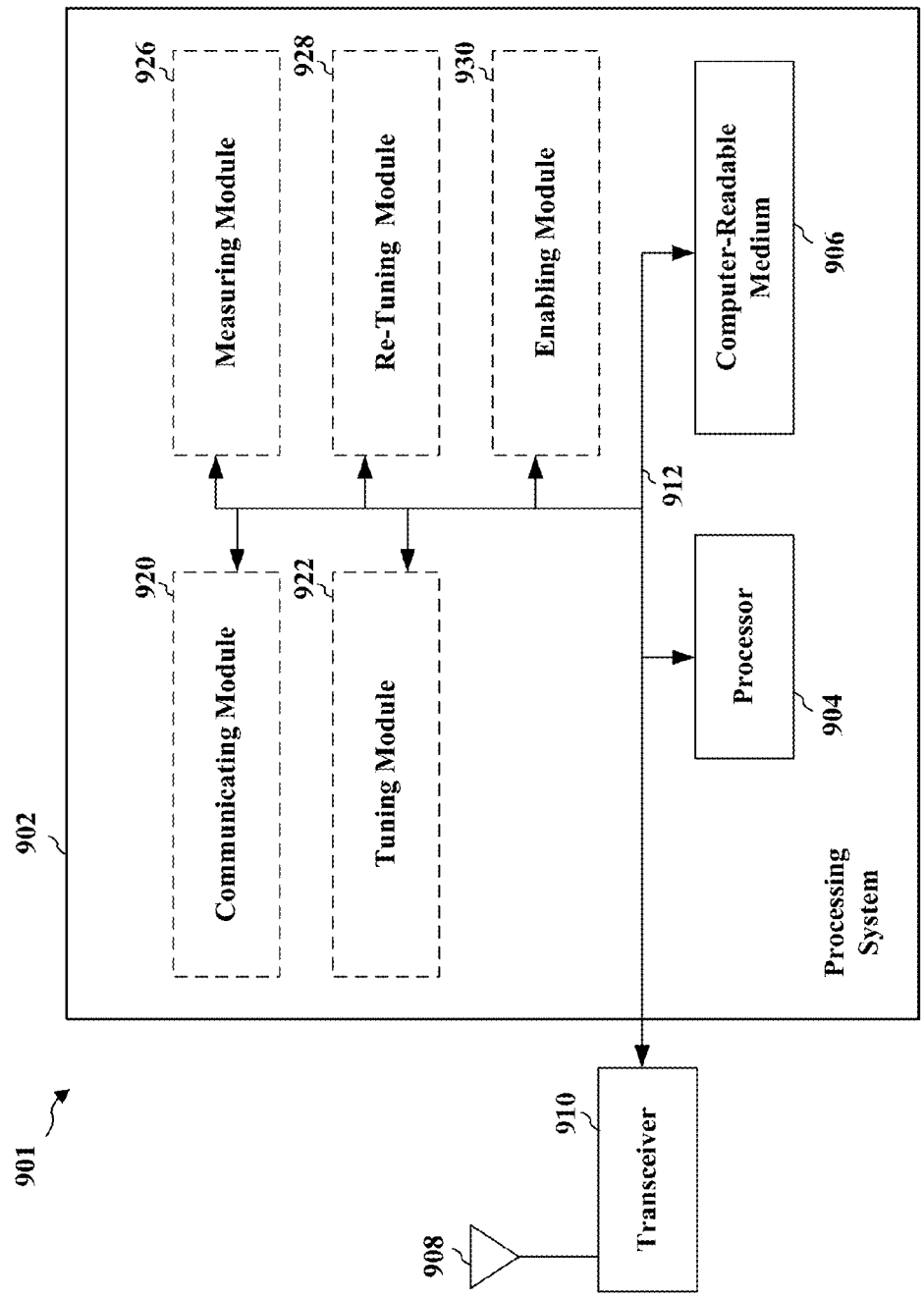
FIG. 9 is a block diagram illustrating different modules/means/components in an exemplary base station apparatus.

FIG. 9 is a diagram illustrating an example of a hardware implementation for an apparatus 901 employing a processing system 902. The processing system 902 may be implemented with a bus architecture, represented generally by the bus 912. The bus 912 may include any number of interconnecting buses and bridges depending on the specific application of the processing system 902 and the overall design constraints. The bus 912 links together various circuits including one or more processors and/or hardware modules, represented by the processor 904, the modules 920, 922, 926, 928, 930 and the computer-readable medium 906. The bus 912 may also link various other circuits such as timing sources, peripherals, voltage regulators, and power management circuits, which are well known in the art, and therefore, will not be described any further.

The processing system 902 is coupled to a transceiver 910. The transceiver 910 is coupled to one or more antennas 908. The transceiver 910 enables communicating with various other apparatus over a transmission medium. The processing system 902 includes a processor 904 coupled to a computer-readable medium 906. The processor 904 is responsible for general processing, including the execution of software stored on the computer-readable medium 906. The software, when executed by the processor 904, causes the processing system 902 to perform the various functions described for any particular apparatus. The computer-readable medium 906 may also be used for storing data that is manipulated by the processor 904 when executing software.

The processing system 902 includes a communicating module 920, tuning module 922, measuring module 926, a re-tuning module 928, and an enabling module 930. The communicating module 920 can communicate with a UE on a first channel. The tuning module 922 can tune to a second channel concurrently with a UE tuning to the second channel. The measuring module 926 can measure a signal strength of the second channel. The re-tuning module 928 can retune to the first channel concurrently with the UE re-tuning to the first channel. The enabling module 930 can enable channel selection based on the signal strength of the second channel. The modules may be software modules running in the processor 904, resident/stored in the computer readable medium 906, one or more hardware modules coupled to the processor 904, or some combination thereof. The processing system 902 may be a component of the base station 610 and may include the memory 676, the transmit processor 616, the receive processor 670, the transmitters/receivers 618, the antenna 620, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    communicating on a first channel with a base station;
    tuning to a second channel concurrently with the base station tuning to at least one of the second channel or a third channel;
    measuring interference on the second channel;
    re-tuning to the first channel concurrently with the base station re-tuning to the first channel; and
    reporting a channel quality, based on the interference, to the base station to enable channel selection.

2. The method of claim 1, further comprising selecting the second channel for communication based on the interference.

3. The method of claim 1, in which the tuning occurs in accordance with a pre-agreed hop pattern indicating times and channels.

4. The method of claim 1, in which the tuning comprises tuning both a transmitter and a receiver.

5. The method of claim 1, further comprising receiving a reference signal on the second channel for measurement.

6. The method of claim 5, in which the reference signal is a downlink common reference signal.

7. The method of claim 5, further comprising measuring a signal strength of the second channel.

8. The method of claim 7, further comprising selecting the second channel for communication based on the signal strength and the interference.

9. The method of claim 7, further comprising reporting the signal strength to the base station.

10. A method of wireless communication, comprising:
    communicating on a first channel with a base station;
    tuning to a second channel;
    measuring interference on the second channel;
    re-tuning to the first channel;
    determining a channel quality based on the interference; and
    reporting the channel quality to the base station to enable channel selection.

11. The method of claim 10, in which at least one of the first channel or second channel includes a white space channel or an authorized shared access channel.

12. A method of wireless communication, comprising:
    communicating on a first channel with a user equipment (UE);
    tuning to a second channel concurrently with the UE tuning to the second channel;
    measuring a signal strength of the second channel;
    re-tuning to the first channel concurrently with the UE re-tuning to the first channel; and
    enabling channel selection based on the signal strength of the second channel.

13. The method of claim 12, further comprising receiving a reference signal on the second channel for measuring the signal strength of the second channel.

14. An apparatus for wireless communication, comprising:
    a memory; and
    at least one processor coupled to the memory, the at least one processor being configured:
        to communicate on a first channel with a base station;
        to tune to a second channel concurrently with the base station tuning to at least one of the second channel or a third channel;
        to measure interference on the second channel;
        to re-tune to the first channel concurrently with the base station re-tuning to the first channel; and
        to report a channel quality, based on the interference, to the base station to enable channel selection.

15. The apparatus of claim 14, in which the at least one processor is further configured to select the second channel for communication based on the interference.

16. The apparatus of claim 14, in which the at least one processor is configured to tune in accordance with a pre-agreed hop pattern indicating times and channels.

17. The apparatus of claim 14, in which the at least one processor is further configured to tune both a transmitter and a receiver.

18. The apparatus of claim 14, in which the at least one processor is further configured to receive a reference signal on the second channel for measurement.

19. The apparatus of claim 18, in which the reference signal is a downlink common reference signal.

20. The apparatus of claim 18, in which the at least one processor is further configured to measure a signal strength of the second channel.

21. The apparatus of claim 20, in which the at least one processor is further configured to select the second channel for communication based on the signal strength and the interference.

22. The apparatus of claim 20, in which the at least one processor is further configured to report the signal strength to the base station.

23. An apparatus for wireless communication, comprising:
    a memory; and
    at least one processor coupled to the memory, the at least one processor being configured:
        to communicate on a first channel with a base station;
        to tune to a second channel;
        to measure interference on the second channel;
        to re-tune to the first channel;
        to determine a channel quality based on the interference; and
        to report the channel quality to the base station to enable channel selection.

24. The apparatus of claim 23, in which at least one of the first channel or second channel includes a white space channel or an authorized shared access channel.

25. The apparatus of claim 23, in which the at least one processor is further configured to receive a reference signal on the second channel to measure the signal strength of the second channel.

26. An apparatus for wireless communication, comprising:
    a memory; and
    at least one processor coupled to the memory, the at least one processor being configured:
        to communicate on a first channel with a user equipment (UE);
        to tune to a second channel concurrently with the UE tuning to the second channel;
        to measure a signal strength of the second channel;
        to re-tune to the first channel concurrently with the UE re-tuning to the first channel; and to enable channel selection based on the signal strength of the second channel.

27. A computer program product for wireless communication in a wireless network, comprising:
a non-transitory computer-readable medium having program code recorded thereon, the program code including:
program code to communicate on a first channel with a base station;
program code to tune to a second channel concurrently with the base station tuning to at least one of the second channel or a third channel;
program code to measure interference on the second channel;
program code to re-tune to the first channel concurrently with the base station re-tuning to the first channel; and
program code to report a channel quality, based on the interference, to the base station to enable channel selection.

28. A computer program product for wireless communication in a wireless network, comprising:
a non-transitory computer-readable medium having program code recorded thereon, the program code including:
program code to communicate on a first channel with a base station;
program code to tune to a second channel;
program code to measure interference on the second channel;
program code to re-tune to the first channel;
program code to determine a channel quality based on the interference; and
program code to report the channel quality to the base station to enable channel selection.

29. A computer program product for wireless communication in a wireless network, comprising:
a non-transitory computer-readable medium having program code recorded thereon, the program code including:
program code to communicate on a first channel with a user equipment (UE);
program code to tune to a second channel concurrently with the UE tuning to the second channel;
program code to measure a signal strength of the second channel;
program code to re-tune to the first channel concurrently with the UE re-tuning to the first channel; and
program code to enable channel selection based on the signal strength of the second channel.

30. An apparatus for wireless communication, comprising:
means for communicating on a first channel with a base station;
means for tuning to a second channel concurrently with the base station tuning to at least one of the second channel or a third channel;
means for measuring interference on the second channel;
means for re-tuning to the first channel concurrently with the base station re-tuning to the first channel; and
means for reporting a channel quality, based on the interference, to the base station to enable channel selection.

31. An apparatus for wireless communication, comprising:
means for communicating on a first channel with a base station;
means for tuning to a second channel;
means for measuring interference on the second channel;
means for re-tuning to the first channel;
means for determining a channel quality based on the interference; and
means for reporting the channel quality to the base station to enable channel selection.

32. An apparatus for wireless communication, comprising:
means for communicating on a first channel with a user equipment (UE);
means for tuning to a second channel concurrently with the UE tuning to the second channel;
means for measuring a signal strength of the second channel;
means for re-tuning to the first channel concurrently with the UE re-tuning to the first channel; and
means for enabling channel selection based on the signal strength of the second channel.

* * * * *